United States Patent
Sahdev

(10) Patent No.: US 10,191,887 B2
(45) Date of Patent: Jan. 29, 2019

(54) CONTEXT AFFINITY IN A REMOTE SCRIPTING ENVIRONMENT

(71) Applicant: Microsoft Technology Licensing, LLC, Redmond, WA (US)

(72) Inventor: Vikas Sahdev, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 387 days.

(21) Appl. No.: 13/945,893

(22) Filed: Jul. 18, 2013

(65) Prior Publication Data

US 2015/0026291 A1  Jan. 22, 2015

(51) Int. Cl.
- G06F 9/54 (2006.01)
- G06F 15/16 (2006.01)
- H04L 29/08 (2006.01)
- G06F 15/173 (2006.01)
- G06F 9/44 (2018.01)

(52) U.S. Cl.
CPC ........ G06F 15/17306 (2013.01); G06F 9/547 (2013.01); *G06F 9/44* (2013.01); *G06F 15/16* (2013.01); *G06F 15/173* (2013.01)

(58) Field of Classification Search
CPC ... G06F 15/17306; G06F 9/547; H04L 67/22; H04L 67/04; H04L 67/02; H04L 67/34
USPC .......................................................... 709/217
See application file for complete search history.

(56) References Cited

U.S. PATENT DOCUMENTS

| | | | |
|---|---|---|---|
| 6,105,067 A * | 8/2000 | Batra | H04L 12/5692 709/203 |
| 6,594,689 B1 | 7/2003 | Nowatzki et al. | |
| 7,243,344 B2 | 7/2007 | Snover et al. | |
| 7,698,359 B2 * | 4/2010 | Wray | G06F 9/45512 709/200 |
| 7,702,796 B2 * | 4/2010 | Shen | H04L 69/40 370/395.21 |

(Continued)

FOREIGN PATENT DOCUMENTS

| | | |
|---|---|---|
| CN | 1466050 A | 1/2004 |
| CN | 1969280 A | 5/2007 |
| CN | 101438247 A | 5/2009 |

OTHER PUBLICATIONS

"RemoteRunspacePool01 Sample", Retrieved at <<http://msdn.microsoft.com/en-us/library/windows/desktop/ee706578(v=vs.85).aspx>>, Retrieved Date: Apr. 27, 2013, pp. 5.

(Continued)

*Primary Examiner* — Kamal B Divecha
*Assistant Examiner* — Clifton Houston
(74) *Attorney, Agent, or Firm* — Michael Best & Friedrich LLP

(57) ABSTRACT

A global context object may be used to create context affinity between two or more commands executed at a remote computer. A local computer may access a connection pool to determine if a runspace exists for a particular context on the remote computer in which the command is to be executed. If the runspace does not exist in the connection pool, the local computer may create a runspace associated with a particular context and add the runspace to the connection pool. The local computer may receive result data of executed commands from a remote computer and store the result data for use by the global context object to create context affinity between two or more commands executed at the remote computer.

17 Claims, 6 Drawing Sheets

(56) References Cited

U.S. PATENT DOCUMENTS

| | | | | |
|---|---|---|---|---|
| 8,180,864 B2* | 5/2012 | Ghattu | .................. | H04L 67/125 |
| | | | | 709/221 |
| 8,806,037 B1* | 8/2014 | Kalra | .................. | H04L 43/0817 |
| | | | | 709/223 |
| 2005/0028167 A1* | 2/2005 | Stall | .................. | G06F 9/451 |
| | | | | 719/314 |
| 2005/0086344 A1* | 4/2005 | Suesserman | ............ | H04L 67/34 |
| | | | | 709/227 |
| 2005/0198648 A1* | 9/2005 | Wray | .................. | G06F 9/45512 |
| | | | | 719/317 |
| 2006/0090167 A1* | 4/2006 | Keohane | ............ | G06F 9/45512 |
| | | | | 719/319 |
| 2006/0095572 A1* | 5/2006 | Burke | .................... | H04L 67/14 |
| | | | | 709/227 |
| 2008/0275951 A1* | 11/2008 | Hind | .................. | H04L 67/22 |
| | | | | 709/204 |
| 2009/0254881 A1 | 10/2009 | Johnson et al. | | |
| 2010/0281173 A1* | 11/2010 | Vutukuri | ............... | G06F 21/305 |
| | | | | 709/228 |
| 2012/0110572 A1 | 5/2012 | Kodi et al. | | |
| 2012/0124217 A1* | 5/2012 | Bartley | ................. | G06F 1/3209 |
| | | | | 709/227 |
| 2013/0347010 A1* | 12/2013 | Frick | ...................... | G06F 9/547 |
| | | | | 719/330 |
| 2014/0012963 A1* | 1/2014 | Swenson | ............. | H04L 41/0813 |
| | | | | 709/220 |
| 2014/0018939 A1* | 1/2014 | Ota | ...................... | G05B 19/056 |
| | | | | 700/19 |
| 2014/0019628 A1* | 1/2014 | Shankar | .................. | G06F 9/541 |
| | | | | 709/228 |
| 2014/0196029 A1* | 7/2014 | Kannan | ............... | G06F 9/45504 |
| | | | | 718/1 |

OTHER PUBLICATIONS

"Windows PowerShell Remoting", Retrieved at <<http://msdn.microsoft.com/en-us/library/windows/desktop/ee706585(v=vs.85).aspx>>, Retrieved Date: Apr. 27, 2013, pp. 5.

"Apple Remote Desktop 3—Remote Administration", Retrieved at <<http://www.apple.com/in/remotedesktop/remoteadministration.html>>, Retrieved Date: Apr. 27, 2013, pp. 2.

Hatcher, E., "Remote scripting using a servlet," IBM Developer Works, Feb. 2001, Available at: ,http://www-106.ibm/developerworks/web/library/wa-resc/, 5 pages.

PCT Search Report dated Nov. 6, 2014 for PCT application No. PCT/US2014/046774, 9 pages.

Internation Perliminary Report on Patentability for Application No. PCT/US2014/046774, dated Sep. 4, 2015, 7 pages.

"Office Action and Search Report Issued in Chinese Patent Application No. 201480040719.6", dated May 3, 2018, 9 Pages.

* cited by examiner

CONTEXT AFFINITY IN A REMOTE SCRIPTING ENVIRONMENT

BACKGROUND

In some conventional remote scripting environments, data piped from the execution of one command at a remote computer to the execution of a subsequent command is limited or prohibited due to security concerns. Because of these and other limitations in conventional remote scripting environments, the context in which one command is executed at a remote computer is often separate and distinct from the context in which a subsequent command is executed. Thus, in conventional remote scripting environments, two or more commands may not share context with each other and, as a result, no affinity is provided between various commands. Current solutions to this problem include setting the context of a first command while running a second command. Another solution may be to bundle the commands. These solutions, though, can be error prone and reduce the performance of the remote scripting environment.

It is with respect to these and other considerations that the disclosure made herein is presented.

SUMMARY

Concepts and technologies are described herein for providing context affinity in a remote scripting environment. The remote scripting environment may include a local computer, or host, from which instructions to execute commands are transmitted and a remote computer at which the instructions are received and the command executed. The local computer accesses a connection pool to determine if a runspace exists for a particular context on the remote computer in which the command is to be executed. If the runspace does not exist in the connection pool, the local computer creates the runspace associated with a particular context and adds the runspace to the connection pool. In some implementations, the runspaces in the connection pool maintain their connection to a particular remote computer. If the runspace is exists in the connection pool, the local computer accesses the runspace from the connection pool and directs the remote computer to execute the command in the context associated with the accessed runspace.

In some configurations, a global context object may be used to create context affinity between two or more commands executed at the remote computer. For example, the local computer may access a particular runspace and direct the remote computer to execute a command in the context associated with the accessed runspace. The local computer may then receive result data of the executed command from the remote computer and update the context in the current runspace. When the local computer accessed the same runspace from the connection pool to run a subsequent command, the local computer may transfer to the remote computer the updated context as an input to the subsequent command. Thus, in some configurations, the subsequent command may be executed in the same context using data obtained from a previously executed command.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the concepts and technologies disclosed herein, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
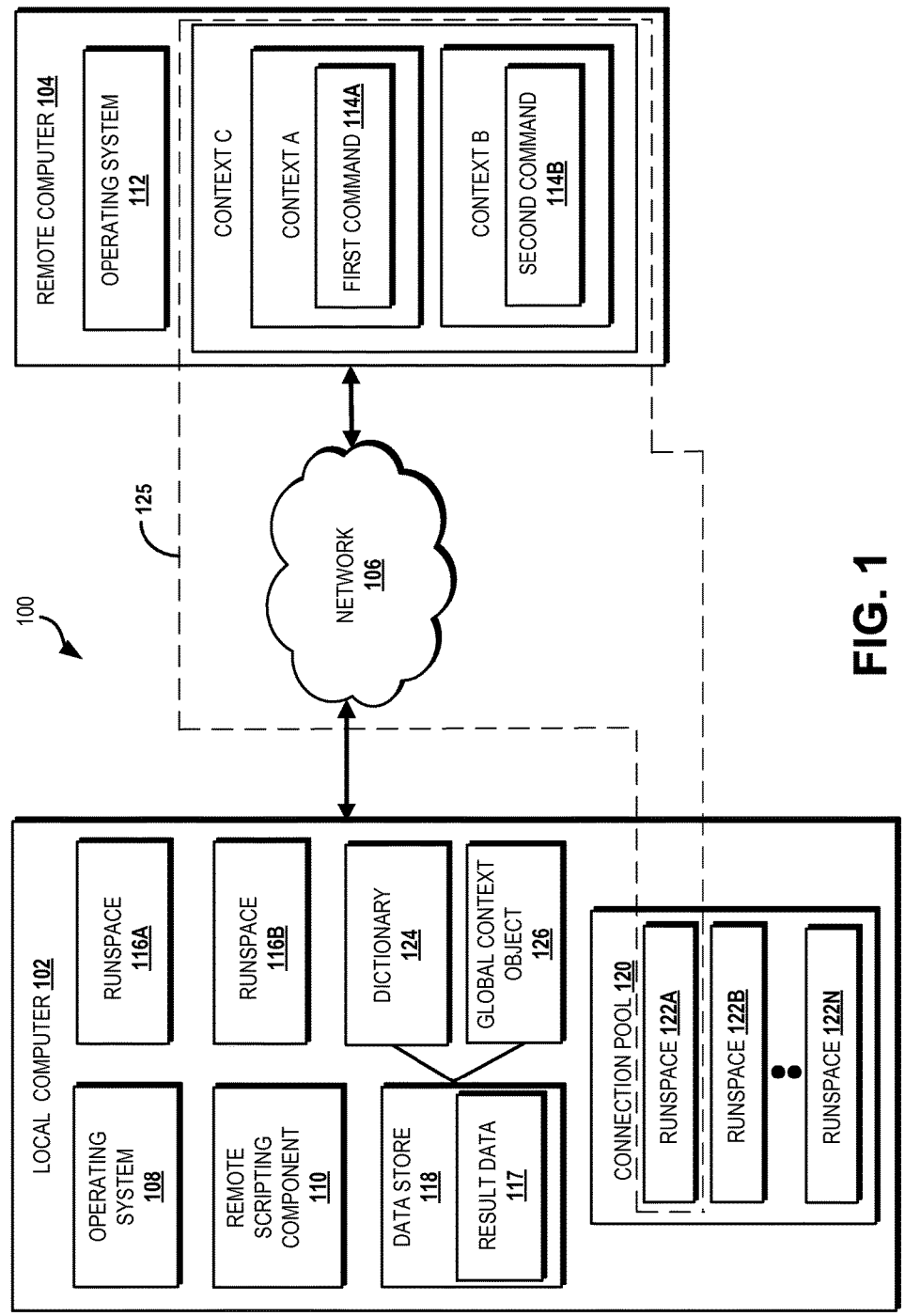
FIG. 1 is a system diagram showing a computing system configured to provide context affinity in a remote scripting environment, in accordance with some embodiments.

The following detailed description is directed to concepts and technologies that, in various embodiments, are designed to provide context affinity in a remote scripting environment. Various configurations of the presently disclosed subject matter create and manage a pool of runspaces. In some configurations, each runspace is connected to a remote computer by executing a global remote session command. When a local computer needs to execute commands on a remote computer that share context with each other, the local computer accesses the pool of runspaces and accessed a specific runspace from the pool. Once the runspace is accessed, the local computer is able to execute commands on the remote computer. Because the commands are executed in the same runspace, the commands are able to share context.

A "runspace" provides a way for a hosting application to execute commands programmatically. A "context" may include the environment in which a command is executed in a runspace. Environment variables provide for the context in which a command executes within a runspace. It should be noted that terms used herein, even though commonly used with certain remote scripting software applications, are not intended to limit the scope of the application to a particular remote scripting software application. The use of any terms, unless otherwise specified, is for convenience and illustrative purposes only.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for providing context affinity in a remote scripting environment will be presented.

Referring now to the figures, FIG. 1 is an overview of a remote scripting environment 100. The remote scripting environment 100 in FIG. 1 includes a local computer 102 and a remote computer 104 operating as a part of and/or in communication with a network 106. According to various implementations of the concepts and technologies disclosed herein, the functionality of the local computer 102 and/or the remote computer 104 can be provided by a cloud-based computing platform that can be provided by one or more application servers, Web servers, data storage systems, network appliances, dedicated hardware devices, and/or other server computers or computing devices.

According to some embodiments, the local computer 102 and/or the remote computer 104 can include a user computing device, such as a tablet computing device, a personal computer ("PC"), a desktop computer, a laptop computer, a notebook computer, a cellular phone or smartphone, other mobile computing devices, a personal digital assistant ("PDA"), or the like. Some example architectures of the local computer 102 and/or the remote computer 104 are illustrated and described below with reference to FIGS. 4-6. For purposes of illustrating and describing the concepts and technologies disclosed herein, the functionality of the local computer 102 and/or the remote computer 104 is described herein as being provided by a server computer. In light of the above alternative embodiments of the local computer 102 and/or the remote computer 104 described above, it should be understood that this example is illustrative, and should not be construed as being limiting in any way.

The local computer 102 can be configured to execute an operating system 108 and one or more application programs such as, for example, a remote scripting component 110, and/or other application programs. The operating system 108 is a computer program for controlling the operation of the local computer 102. In a similar manner, the remote computer may be configured to execute an operating system 112. Application programs are executable programs configured to execute on top of the operating system 108, if on the local computer 102, and the operating system 112, if on the remote computer 104, to provide the functionality described herein for providing context affinity in the remote scripting environment 100.

At the remote computer 104, along with controlling the operating of the remote computer 104, the operating system 112 may also execute commands in the remote scripting environment 100 received from the local computer. For example, the operating system 112 may be configured to execute a first command 114A and a second command 114B upon receipt of the instruction from the local computer 102. In some configurations, the first command 114A or the second command 114B may include, but is not limited to, a stand-alone executable or an instance of a class. In other configurations, the first command 114A or the second command 114B may process inputs from a pipeline rather than from streams of texts. In still further configurations, the first command 114A or the second command 114B may perform their own parsing, error presentation, or output formatting, or may be configured to allow those and other functions to be handled by another application.

When executed, the first command 114A and the second command 114B are executed in a context such as context A for the first command 114A and the context B for the second command 114B. As mentioned above, a context may be defined by the variables in which the first command 114A or the second command 114B executes within a particular runspace. For example, the local computer 102 may transmit a command to the remote computer 104 to cause the remote computer 104 to execute the first command 114A in a runspace 116A. The first command 114A may receive variables associated with the runspace 116A and execute within the context A.

The local computer 102 may receive result data 117 generated by the execution of the first command 114A and store the result data 117 in a data store 118. In a similar manner, the local computer 102 may transmit a command to the remote computer 104 to cause the remote computer 104 to execute the second command 114B in a runspace 116B. The second command 114B may receive variables associated with the runspace 116B and execute within the context B. The local computer 102 may receive the result data 117 generated by the execution of the second command 114B and store the result data 117 in the data store 118.

Because the runspace 116A and the runspace 116B do not share variables, the context A in which the first command 114A and the context B in which the second command 1114B executes share no affinity. The result data 117 generated as a result of the second command 114B is unrelated to the result data 117 generated as a result of the first command 114A because the contexts in which the first command 114A and the second command 114B execute are separate. To provide for context affinity, the local computer 102 may create a connection pool 120.

The connection pool 120 may include pool runspaces 122A-122N (hereinafter the pool runspaces 122A-122N are referred to collectively and/or generically as "the pool runspaces 122", or, individually as "the pool runspace 122A," "the pool runspace 122B," and so forth). The status of the connection pool 120 and the pool runspaces 122 may be stored in a dictionary 124. The status may include the existence of the connection pool 120 and the pool runspaces 122. The status may also include whether or not any connections exist, as will be explained in more detail below.

The dictionary 124 may be accessible by the remote scripting component 110 to determine if a connection pool 120 exists, and if so, if the connection pool 120 is available. In some configurations, even though the connection pool 120 may have been initiated by the remote scripting component 110, the connection pool 120 may be otherwise unavailable for use. The dictionary 124 may be stored in the data store 118 or another suitable memory location. If the connection pool 120 is available, the remote scripting component 110 may determine if a connection to the remote computer 104 is available in the connection pool 120.

In one configuration, the remote scripting component 110 may access the dictionary 124 to determine if a connection 125 is available from one or more connections. As mentioned above, the dictionary 124 may store the status of any connections between the pool runspaces 122 and any computer, including the remote computer 104. In one configuration, the pool runspaces 122 may be special purpose runspaces initiated and maintained to provide a connection to a remote computer, including the remote computer 104. The dictionary 124 may have the status of the various pool runspaces 122.

If the remote scripting component 110 receives an instruction to cause the execution of the first command 114A or the second command 114B, the remote scripting component 110 may access the dictionary 124 to determine if a pre-existing connection has been established using one of the pool runspaces 122, such as the connection 125. In some configurations, the connection 125 may be persisted between the executions of commands at the remote computer 104.

If the connection 125 is available, the remote scripting component 110 may access the applicable runspace of the pool runspaces 122. In the configuration illustrated in FIG. 1, the applicable runspace of the pool runspaces 122 is the pool runspace 122A. If the connection 125 is not available, the remote scripting component 110 may cause the initiation of a runspace, add the runspace to the connection pool 120, and update the dictionary 124 accordingly. The remote scripting component 110 may initiate the connection 125 within the pool runspace 122A and execute the first command 114A and the second command 114B. It should be appreciated that there is no requirement that the execution of the first command 114A and the second command 114B occur in a particular time period or any other programming constraint. For example, the remote scripting component 110 may execute the first command 114A, perform other functions using other pool runspaces 122, and thereafter execute the second command 114B.

In some configurations, the execution of the first command 114A and the subsequent execution of the second command 114B within a particular runspace, such as the pool runspace 122A, may still not provide the affinity needed or desired between the context A and the context B. Thus, the remote scripting component 110 may initiate a global context object 126. The global context object 126 may be one or more variables associated with a particular runspace. The global context object 126 may be received as a variable from one of the connections provided by one of the pool runspaces 122.

In one implementation, the remote scripting component 110 may use the connection 125 provided by the pool runspace 122A to execute the first command 114A. The global context object 126 may be passed to the first command 114A as a variable to execute the first command 114A in the context A. Each connection in the connection pool 120 may maintain its own global context object 126. The local computer 102 may receive data from the execution of the first command 114A and update the global context object 126 to provide an updated global context object 126. Thereafter, the remote scripting component 110 may again use the connection 125 provided by the pool runspace 122A to execute the second command 112B. The remote scripting component 110 may pass the updated global context object 126 along with updated context to the second command 114B as a variable.

While the second command 114B may execute in the context B, because the output from the execution of the first command 114A is passed to the second command 114B as the updated global context object 126 with the same connection, the connection 125, the context in which the second command 114B executes may be a context having an affinity with the context A. In other words, while the first command 114A and the second command 114B may operate in their own contexts, such as the context A and the context B, by using global context object 126, the first command 114A and the second command 114B may execute in a global context, represented by a context C. In some configurations, the use of the connection pool 120 to maintain connections provided by the pool runspaces 122 and the sharing of the global context object 126 between commands executed at the remote compute 104 may provide an affinity between the context A and the context B.

Figure 2:
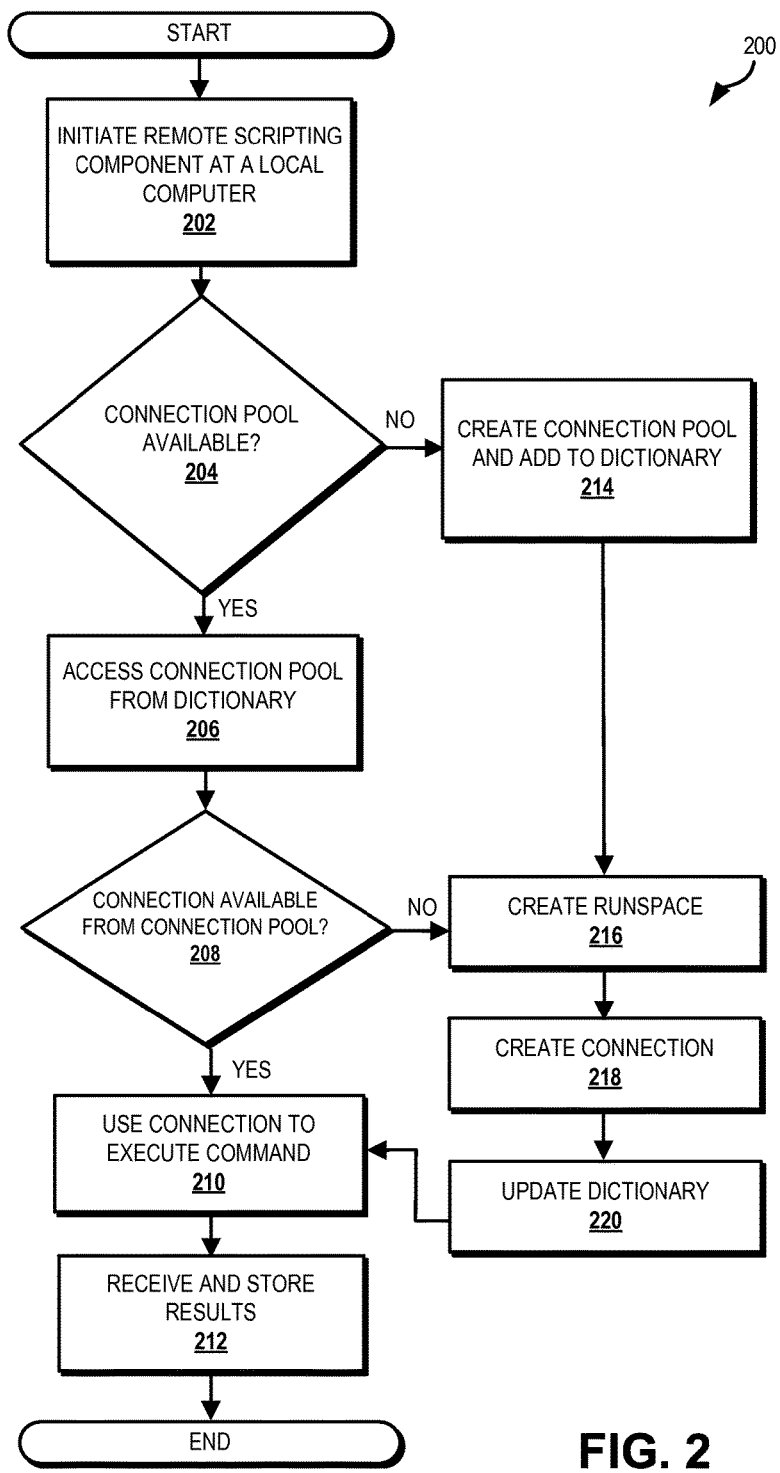
FIG. 2 is a flow diagram illustrating aspects of an exemplary method for providing context affinity in a remote scripting environment, in accordance with some embodiments.

FIG. 2 is flow diagram illustrating an exemplary method 200 for providing context affinity in the remote scripting environment 100. It should be understood that the operations of the method 200 and other methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in their entirety.

Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Turning to FIG. 2, the method 200 begins and proceeds to operation 202, where the remote scripting component 110 is initiated at the local computer 102. The presently disclosed subject matter is not limited to any particular application or operating environment for the remote scripting component 110. For example, remote scripting may be performed on computers or networks using operating systems such as OS X by Apple Inc. in Cupertino, Calif., ANDROID by Google Inc. in Mountain View, Calif., WINDOWS by Microsoft Corporation in Redmond, Wash., Z/OS by IBM Corporation in Armonk, N.Y., as well as other operating systems that may or may not have roots in UNIX or LINUX. The presently disclosed subject matter is not limited to any particular operating system.

The method proceeds from operation 202 to operation 204, where a determination is made as to whether or not a connection pool 120 is available. In some configurations, the connection pool 120 includes the pool runspaces 122. The status of the connection pool 120 may be stored in the dictionary 124. In further configurations, the remote scripting component 110 may access the dictionary 124 to determine if the connection pool 120 exists and if it is available for use. In some instances, the connection pool 120 may exist but may not be available to the remote scripting component 110.

In response to determining that the connection pool 120 is available, the method 200 proceeds from operation 204 to operation 206, where the remote scripting component 110 accesses the connection pool 120 using the dictionary 124. As mentioned above, the dictionary 124 may have stored the status of the connection pool 120 as well as other aspects of the connection pool 120. In one configuration, the connection pool 120 may be stored as data structures in the dictionary 124. It should be understood that the connection pool 120 may be stored in one data store, such as the data store 118, or in several data stores accessible by the local computer 102.

The method 200 proceeds from operation 206 to operation 208, where a determination is made as to whether or not a connection, such as the connection 125, is available from the connection pool 120. As described above, the connection 125 is a connection formed between the local computer 102 and the remote computer 104. The connection 125 facilitates the remote scripting environment 100 between the local computer 102 and the remote computer 104. In some configurations, the connection 125 may be a persistent connection that is maintained between the local computer 102 and the remote computer 104.

In response to a determination that the connection 125 is available from the connection pool 120 at operation 208, the method 200 proceeds to operation 210, where the remote scripting component 110 uses the connection 125 to execute a command at the remote computer 104. The remote scripting component 110 may use the pool runspace 122A provided by the connection 125 that creates the context at the remote computer 104 in which the command is executed.

The method 200 proceeds from operation 210 to operation 212, where the local computer 102 receives and stores the result data 117. In some configurations, the result data 117 may be associated with a global context object 126 stored in the data store 118. In some configurations, the global context object 126 may provide for context affinity between the executions of several commands at the remote computer 104. The global context object 126 may be provided as an input to the commands at the remote computer 104. The passing of the global context object 126 creates a relationship between the various commands executed at the remote computer 104 because the commands use the global context object 126. This is explained in more detail in FIG. 3, below.

If in operation 204 the connection pool 120 is not available, the method 200 proceeds from operation 204 to operation 214, where the connection pool 120 is created and added to the dictionary 124. As mentioned above, the connection pool 120 may be created and stored in various configurations. The present configuration in which the dictionary 124 is used is merely illustrative.

The method 200 proceeds from operation 214 to operation 216, where the pool runspace 122A is created. The connection pool 120 may be created with one or more runspaces. The present disclosure is not limited to any particular number of runspaces in the connection pool 120. For example, the connection pool 120 may be created with the pool runspaces 122, or, the connection pool 120 may be created with only the pool runspace 122A.

The method 200 proceeds from operation 216 to operation 218, where the connection 125 is created. The connection 125 may be a persistent connection that is maintained by the remote scripting component 110. The connection 125 is a communicative connection between the local computer 102 and the remote computer 104.

The method 200 proceeds from operation 218 to operation 220 where the dictionary 124 is updated with the connection 125. The method 200 thereafter proceeds as described above. The method 200 proceeds to operation 210, where the connection 125 is used to execute the command. The result data 117 are received and stored at operation 212.

If in operation 208 a determination is made that the connection 125 is not available, the method 200 proceeds from operation 208 to operation 216, where pool runspace 122A is created. The method 200 then proceeds as described directly above. Thereafter, the method 200 ends.

As mentioned above, it may be desirable or necessary to create and use the global context object 126 to create an affinity between the context A in which the first command 114A executes and the context B in which the second command 114B executes. The global context object 126, along with the connection pool 120, helps to create the common context C in which the first command 114A and the second command 114B execute.

Figure 3:
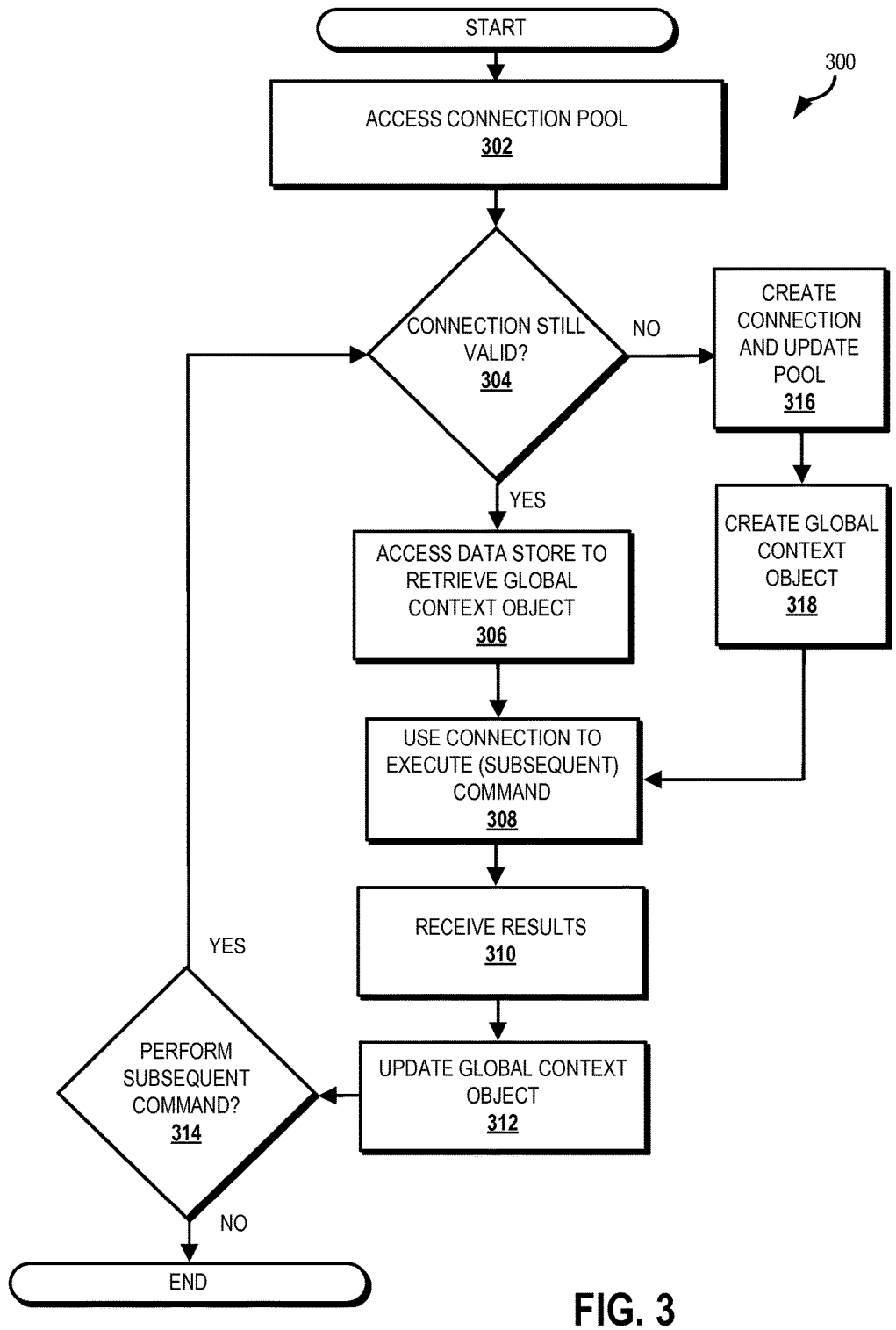
FIG. 3 is a flow diagram illustrating aspects of an exemplary method for providing context affinity in a remote scripting environment, in accordance with some embodiments.

FIG. 3 is a flow diagram illustrating an exemplary method 300 for providing a global context object to provide for context affinity in the remote scripting environment 100. The method 300 begins at operation 302, where the remote scripting component 110 accesses the connection pool 120. It should be understood that FIG. 3 assumes that the connection pool 120 is created and available for use by the remote scripting component 110. FIG. 2 provides an exemplary method for creating the connection pool 120.

The method 300 proceeds from operation 302 to operation 304, where a determination is made as to whether or not the connection 125 is still valid. To maintain an affinity, a particular context at the remote computer 104, such as the context C, is created by a particular runspace in the connection pool 120, such as the pool runspace 122A. Data associated with the pool runspace 122A may be consistent between the commands using the data by associating the pool runspace 122A with a particular connection, such as the connection 125.

If the connection 125 is valid, the method 300 proceeds from operation 304 to operation 306, where the global context object 126 is retrieved at the data store 118. As described above, the global context object 126 may be one or more variables passed to the remote computer 104 to create the context C in which one or more commands are executed.

The method 300 proceeds from operation 306 to operation 308, where the connection 125 is used to execute a command. The command may be an initial command using an initial global context object 126 or a subsequent command using an updated global context object 126. For example, the initial command may be the first command 114A and the subsequent command may be the second command 114B.

The method 300 proceeds from operation 308 to operation 310, where the result data 1117 are received from the execution of the command at the remote computer 104. The presently disclosed subject matter is not limited to any particular type of result data 117 from the remote computer 104. Further, it should be appreciated that various configurations of the presently disclosed subject matter may not require the receipt of the result data 117, as some commands may not provide the result data 117 in a state transmittable to the local computer 102.

The method 300 proceeds from operation 310 to operation 312, where the global context object 126 is updated from the result data 117. In some configurations, the global context object 126 may be the result returned in operation 310. In other configurations, the global context object 126 may be data that is updated based on the data received in operation 310. It should be understood that the presently disclosed subject matter is not limited to requiring that the global context object 126 is updated. In some configurations, the global context object 126 may be maintained from command execution to command execution.

The method 300 proceeds from operation 312 to operation 314, where a determination is made as to whether or not a subsequent command is to be performed. If a subsequent command is to be performed, the method 300 recommences at operation 304. If a subsequent command is not to be performed, the method 300 ends. It should be understood that the presently disclosed subject matter does not require that the operation 314 be performed in a certain time frame or programmatic sequence. For example, an initial command may first be executed and prior to the execution of a subsequent command, a certain period of time may lapse or the local computer 102 may perform other functions related or unrelated to the connection 125.

Returning to operation 304, if at operation 304 a determination is made that the connection 125 is not valid, the method 300 proceed from operation 304 to operation 316, where the connection 125 is created and the dictionary 124 is updated. As discussed above, in some configurations, the dictionary 124 may be used to store the status of the connection 125. In other configurations, the dictionary 124 may be used to store data other than or in addition to the status that facilitates the use of the connection 125.

The method 300 proceeds from operation 316 to operation 318, where the global context object 126 is created. The global context object 126 may be stored in the dictionary 124 or another suitable data store. It should be noted that the presently disclosed subject matter does not require the performance of operation 318, as the global context object 126 may have been created in a previous operation. Operation 318 may be used if the global context object 126 has not been created. The method 300 proceeds from operation 318 to operation 308, where the method 300 proceeds as described above.

Figure 4:
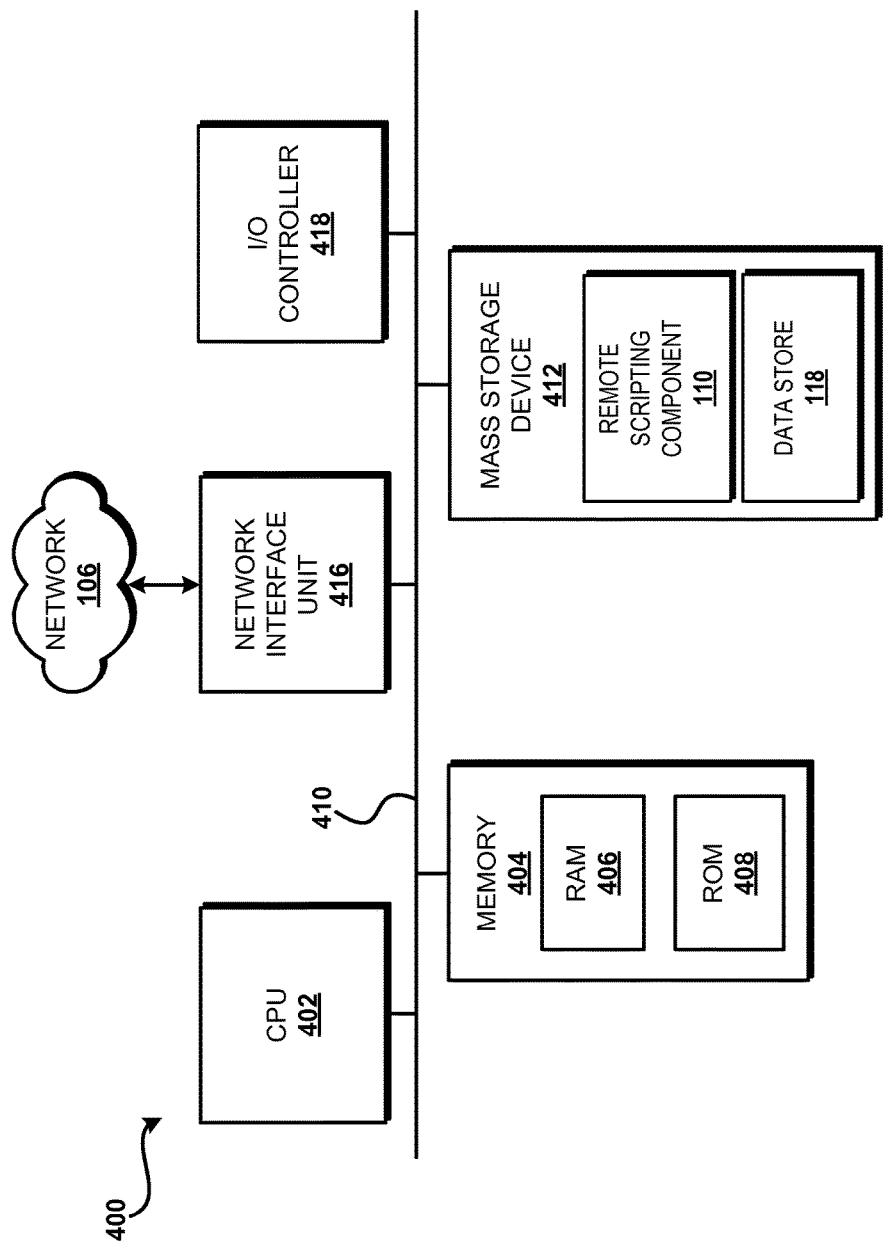
FIG. 4 is a computer architecture diagram showing an illustrative computer hardware and software architecture for a computing system capable of implementing aspects of the embodiments presented herein, in accordance with some embodiments.

FIG. 4 illustrates an illustrative computer architecture 400 for a device capable of executing the software components described herein for providing context affinity in the remote scripting environment 100. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit ("CPU") 402, a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 108 from FIG. 1 and one or more application programs or data stores including, but not limited to, the remote scripting component 110 and the data store 118.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 400. For purposes of the claims, the phrase "computer storage medium," and variations thereof, does not include waves or signals per se and/or communication media.

According to various embodiments, the computer architecture 400 may operate in a networked environment using logical connections to remote computers through a network such as the network 106. The computer architecture 400 may connect to the network 106 through a network interface unit 416 connected to the bus 410. It should be appreciated that the network interface unit 416 also may be utilized to connect to other types of networks and remote computer systems. The computer architecture 400 also may include an input/output controller 418 for receiving and processing input from a number of other devices, including a keyboard, mouse, or electronic stylus. Similarly, the input/output controller 418 may provide output to a display screen, a printer, or other type of output device.

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
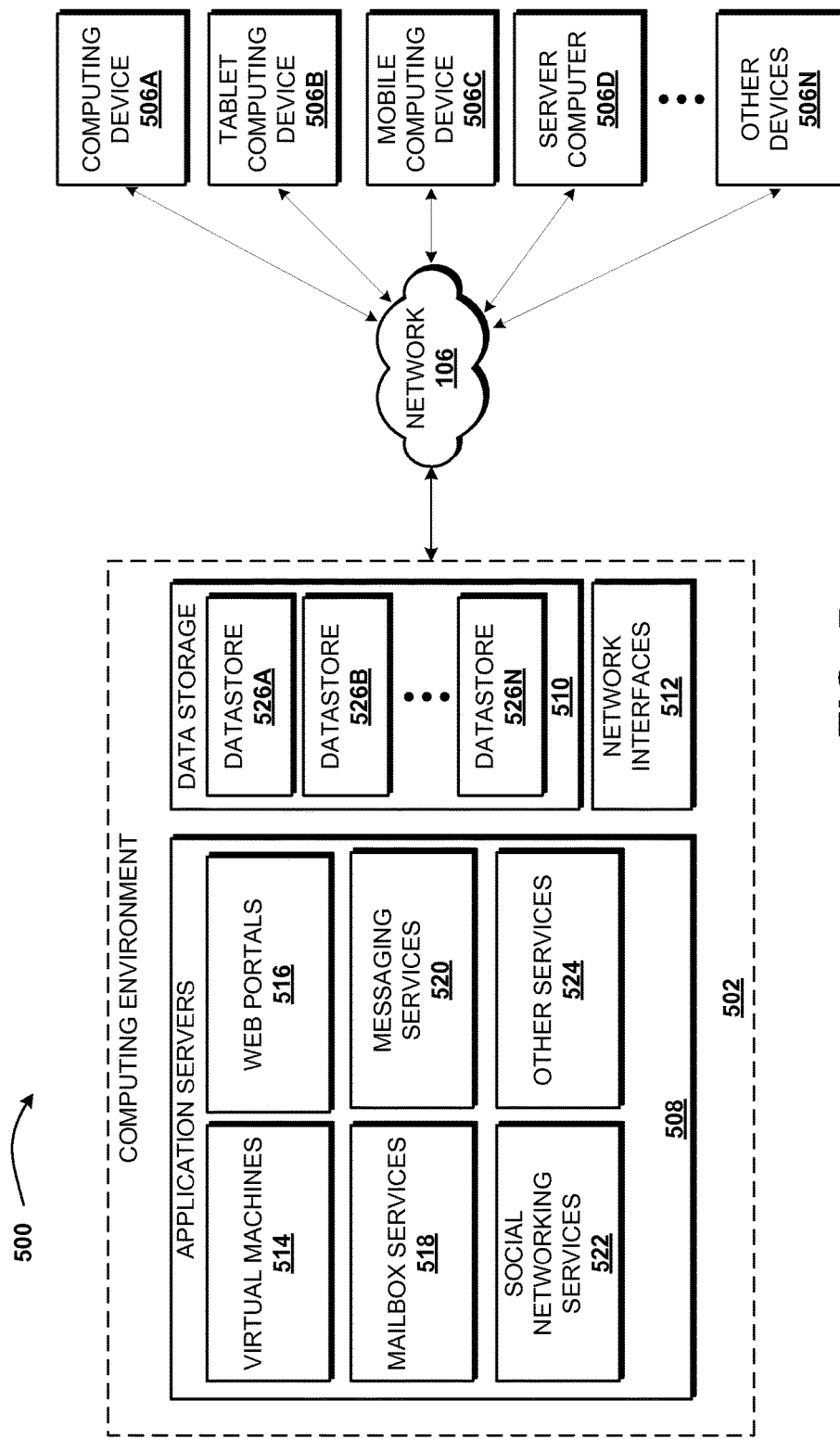
FIG. 5 is an illustration showing a distributed computing environment capable of executing the software components described herein for providing context affinity in a remote scripting environment, in accordance with some embodiments.

FIG. 5 illustrates an illustrative distributed computing environment 500 capable of executing the software components described herein for providing context affinity in the remote scripting environment 100. Thus, the distributed computing environment 500 illustrated in FIG. 5 can be used to provide the functionality described herein. The distributed computing environment 500 thus may be utilized to execute any aspects of the software components presented herein.

According to various implementations, the distributed computing environment 500 includes a computing environment 502 operating on, in communication with, or as part of the network 106. The network 106 also can include various access networks. One or more client devices 506A-506N (hereinafter referred to collectively and/or generically as "clients 506") can communicate with the computing environment 502 via the network 106 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 106. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for searching for providing context affinity in the remote scripting environment 100. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other resources") 524. The other resources 524 can include, but are not limited to, the remote scripting component 110. It thus can be appreciated that the computing environment 502 can provide integration of the concepts and technologies disclosed herein with various mailbox, messaging, social networking, and/or other services or resources. For example, the concepts and technologies disclosed herein can integrated social networking information into various searches and provide those results to a user in conjunction with internal knowledge.

As mentioned above, the computing environment 502 can include the data storage 510. According to various implementations, the functionality of the data storage 510 is provided by one or more data stores operating on, or in communication with, the network 106. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the data stores 118 shown in FIG. 2.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for providing context affinity in the remote scripting environment 100.

Figure 6:
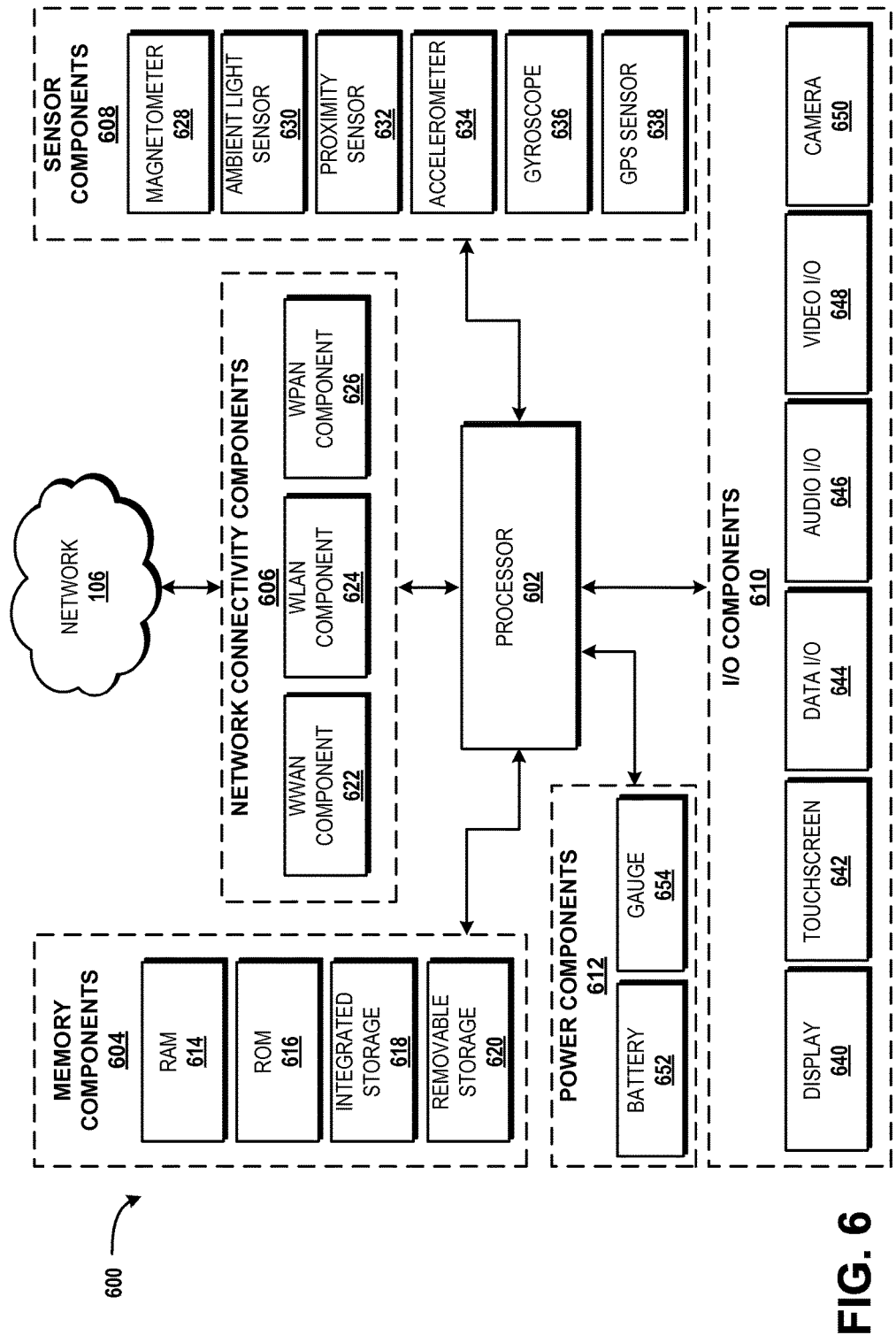
FIG. 6 is an illustration showing a computing device architecture for a computing device that is capable of executing various software components described herein for providing context affinity in a remote scripting environment, in accordance with some embodiments.

Turning now to FIG. 6, an illustrative computing device architecture 600 for a computing device that is capable of executing various software components described herein for providing context affinity in the remote scripting environment 100. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 506 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output ("I/O") components 610, and power components 612. In the illustrated embodiment, the processor 602 is in communication with the memory components 604, the network connectivity components 606, the sensor components 608, the I/O components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 616 or a portion thereof, and/or some combination the RAM 614 and the ROM 616 is integrated in the processor 602. In some embodiments, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 106, which may be a WWAN, a WLAN, or a WPAN. Although a single network 106 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

The network 106 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 106 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 106 may be configured to provide voice and/or data communications with any combination of the above technologies. The network 106 may be configured to or adapted to provide voice and/or data communications in accordance with future generation technologies.

In some embodiments, the WWAN component 622 is configured to provide dual-multi-mode connectivity to the network 106. For example, the WWAN component 622 may be configured to provide connectivity to the network 106, wherein the network 106 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 106 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 106 via the WI-FI access points. Such connections may be secured via various encryption technologies including, but not limited, WI-FI Protected Access ("WPA"), WPA2, Wired Equivalent Privacy ("WEP"), and the like.

The network 106 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some embodiments the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some embodiments, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some embodiments, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 632 are contemplated.

The accelerometer 634 is configured to measure proper acceleration. In some embodiments, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some embodiments, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some embodiments, output from the gyroscope 636 is used by an application program as an input mechanism to control some functionality of the application program. For example, the gyroscope 636 can be used for accurate recognition of movement within a 3D data environment of a video game application or some other application. In some embodiments, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some embodiments, the display 640 and the touchscreen 642 are combined. In some embodiments two or more of the data I/O component 644, the audio I/O interface component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 640 is a liquid crystal display ("LCD") utilizing any active or passive matrix technology and any backlighting technology (if used). In some embodiments, the display 640 is an organic light emitting diode ("OLED") display. Other display types are contemplated.

The touchscreen 642 is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 642 is incorporated on top of the display 640 as a transparent layer to enable a user to use one or more touches to interact with objects or other information presented on the display 640. In other embodiments, the touchscreen 642 is a touch pad incorporated on a surface of the computing device that does not include the display 640. For example, the computing device may have a touchscreen incorporated on top of the display 640 and a touch pad on a surface opposite the display 640.

In some embodiments, the touchscreen 642 is a single-touch touchscreen. In other embodiments, the touchscreen 642 is a multi-touch touchscreen. In some embodiments, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some embodiments, the touchscreen 642 supports a tap gesture in which a user taps the touchscreen 642 once on an item presented on the display 640. The tap gesture may be used for various reasons including, but not limited to, opening or launching whatever the user taps. In some embodiments, the touchscreen 642 supports a double tap gesture in which a user taps the touchscreen 642 twice on an item presented on the display 640. The double tap gesture may be used for various reasons including, but not limited to, zooming in or zooming out in stages. In some embodiments, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some embodiments, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some embodiments, the touchscreen 642 supports a flick gesture in which a user swipes a finger in the direction the user wants the screen to move. The flick gesture may be used for various reasons including, but not limited to, scrolling horizontally or vertically through menus or pages. In some embodiments, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some embodiments, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 646 is configured to provide audio input and/or output capabilities to the computing device. In some embodiments, the audio I/O interface component 644 includes a microphone configured to collect audio signals. In some embodiments, the audio I/O interface component 644 includes a headphone jack configured to provide connectivity for headphones or other external speakers. In some embodiments, the audio I/O interface component 646 includes a speaker for the output of audio signals. In some embodiments, the audio I/O interface component 644 includes an optical audio cable out.

The video I/O interface component 648 is configured to provide video input and/or output capabilities to the computing device. In some embodiments, the video I/O interface component 648 includes a video connector configured to receive video as input from another device (e.g., a video media player such as a DVD or BLURAY player) or send video as output to another device (e.g., a monitor, a television, or some other external display). In some embodiments, the video I/O interface component 648 includes a High-Definition Multimedia Interface ("HDMI"), mini-HDMI, micro-HDMI, DisplayPort, or proprietary connector to input/output video content. In some embodiments, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some embodiments, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some embodiments, the battery gauge 654 is configured to measure the effect of a battery's discharge rate, temperature, age and other factors to predict remaining life within a certain percentage of error. In some embodiments, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component (not illustrated).

Based on the foregoing, it should be appreciated that concepts and technologies for providing context affinity in the remote scripting environment 100 have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing context affinity in a remote scripting environment by creating a plurality of runspaces, each of the plurality of runspaces associated with a connection between a local computer and a remote computer, wherein each of the plurality of runspaces is associated with a global context object, the method comprising:

initiating, on the local computer that transmits remote session commands, a remote scripting component;

creating, by the remote scripting component, a connection between the local computer and the remote computer, wherein said creating the connection creates a particular run space of the plurality of runspaces;

initiating, by the remote scripting component, a global context object associated with the connection, wherein the global context object includes a variable providing a context to execute one or more remote session commands via the particular runspace;

determining, by the remote scripting component at the local computer, that a connection pool is available from a dictionary stored on the local computer, wherein the connection pool is associated with the plurality of runspaces;

based at least partly on a determination that the connection pool is available, determining, by the remote scripting component that the connection between the local computer and the remote computer is available in the connection pool;

based at least partly on a determination that the connection between the local computer and the remote computer is available in the connection pool:

sending, by the remote scripting component from the local computer to the remote computer via the connection, a first remote session command to be executed by the remote computer in the particular runspace;

sending, by the remote scripting component from the local computer to the remote computer via the connection, the global context object;

receiving, by the remote scripting component at the local computer, result data based at least partly on execution of the first remote session command within the particular runspace based on the variable included in the global context object providing the context for the particular runspace;

updating, by the remote scripting component based at least in part on the result data, the global context object at the local computer to generate an updated global context object; and sending, by the remote scripting component from the local computer to the remote computer, the updated global context object with a second remote session command to be executed by the remote computer in the particular runspace;

wherein the second remote session command is executed within the particular runspace using the updated global context object as updated after execution of the first remote session command;

wherein the global context object creates a context affinity between the first remote session command executed by the remote computer and the second remote session command executed by the remote computer;

wherein creating a context affinity between the first remote session command and the second remote session command executed by the remote computer includes using both the connection and the global context object when executing the first remote session command and the second remote session command; and wherein each of the plurality of runspaces maintains a global context object and wherein the global context object of a runspace allows two or more commands to be executed within the runspace when the two or more commands do not share a common context by defining a new shared context for executing the two or more commands.

2. The computer-implemented method of claim 1, further comprising creating, by the remote scripting component, the connection pool based at least partly on a determination that the connection pool is not available.

3. The computer-implemented method of claim 2, further comprising adding, by the remote scripting component, the connection pool to the dictionary.

4. The computer-implemented method of claim 1, further comprising updating, by the remote scripting component, the connection pool in the dictionary.

5. The computer-implemented method of claim 1, further comprising using, by the remote scripting component, the connection to execute the second remote session command at the remote computer.

6. A local computer configured to provide context affinity in a remote scripting environment by creating a plurality of runspaces, each of the plurality of runspaces associated with a connection between the local computer and a remote computer, wherein each of the plurality of runspaces is associated with a global context object, the local computer comprising:
   a processor; and
   a non-transitory computer-readable storage medium in communication with the processor, the non-transitory computer-readable storage medium comprising computer-executable instructions stored thereupon which, when executed by the processor, cause the processor to:
   initiate, by a remote scripting component, a connection pool at the local computer, the connection pool comprising a plurality of connections, wherein the connection pool is associated with the plurality of runspaces;
   form, by the remote scripting component, the remote scripting environment between the local computer and the remote computer by using a connection of the plurality of connections, wherein the connection creates a particular runspace of the plurality of runspaces;
   initiate, by the remote scripting component, a global context object at the local computer, wherein the global context object includes a variable providing a context to execute one or more remote session commands via the particular runspace, the global context object being associated with the connection;
   send, by the remote scripting component via the connection, a first instruction to the remote computer to execute a first remote session command in the particular runspace, wherein the first instruction includes the global context object;
   receive, by the remote scripting component via the connection, result data from the remote computer comprising a result of execution of the first remote session command with the particular runspace;
   update, by the remote scripting component at the local computer, based at least in part on the result data, the global context object to create an updated global context object;
   send, by the remote scripting component via the connection, a second instruction to the remote computer to execute a second remote session command in the particular runspace, wherein the second instruction includes the updated global context object associated with the connection;
   wherein the second remote session command is executed within the particular runspace using the updated global context object as updated after execution of the first remote session command;
   wherein the global context object creates a context affinity between the first remote session command executed by the remote computer and the second remote session command executed by the remote computer;
   wherein creating a context affinity between the first remote session command and the second remote session command executed by the remote computer by using both the connection and the global context object when executing the first remote session command and the second remote session command; and
   wherein each of the plurality of runspaces maintains a global context object and wherein the global context object of a runspace allows two or more commands to be executed within the runspace when the two or more commands do not share a common context by defining a new shared context for executing the two or more commands.

7. The local computer of claim 6, wherein the non-transitory computer-readable storage medium further comprises computer-executable instructions that cause the processor to:
   receive, by the remote scripting component, additional result data comprising a result of execution of the second remote session command; and
   update, by the remote scripting component, the updated global context object based at least in part on the result of the execution of the second remote session command.

8. The local computer of claim 6, wherein the instructions to initiate, by the remote scripting component, the connection pool at the local computer further comprise instructions to determine whether the connection pool is available.

9. The local computer of claim 8, wherein the non-transitory computer-readable storage medium comprises further computer-executable instructions that cause the processor to:
   create, by the remote scripting component, the connection pool; and
   update, by the remote scripting component, a dictionary based at least partly on a determination that the connection pool is not available.

10. The local computer of claim 8, wherein the non-transitory computer-readable storage medium comprises further computer-executable instructions that cause the processor to:
   create, by the remote scripting component, the connection of the plurality of connections; and
   update, by the remote scripting component, the connection pool based at least partly on a determination that the connection of the plurality of connections is not available.

11. The local computer of claim 6, wherein the instructions to form the remote scripting environment between the local computer and the remote computer by using the connection of the plurality of connections comprise instructions to determine, by the remote scripting component, whether the connection of the plurality of connections is available.

12. The local computer of claim 6, wherein the non-transitory computer-readable storage medium comprises further computer-executable instructions that cause the processor to maintain, by the remote scripting component, the connection of the plurality of connections.

13. The local computer of claim 6, wherein the non-transitory computer-readable storage medium further comprises computer-executable instructions that cause the processor to create a context affinity between the first remote session command and the second remote session command by using both the connection and the global context object.

14. A non-transitory computer-readable storage device having computer-executable instructions stored thereupon which, when executed by a local computer provide a context affinity in a remote scripting environment by creating a plurality of runspaces, each of the plurality of runspaces associated with a connection between the local computer and a remote computer, the computer-executable instructions causing the local computer to:
   initiate, on the local computer, a remote scripting component configured to cause the local computer to send instructions to the remote computer to execute a first remote session command and a second remote session command;

initiate, by the remote scripting component on the local computer a connection pool comprising a plurality of connections, each connection of the plurality of connections being associated with a global context object, wherein the connection creates a particular runspace in the local computer which is connected to the remote computer, the global context object including a variable providing a context to execute one or more remote session commands via the particular runspace and being maintained between the local computer and the remote computer;

add, by the remote scripting component, the connection pool to a dictionary, wherein the connection pool is associated with the plurality of runspaces;

send, by the remote scripting component via the connection, a first instruction to the remote computer to execute the first remote session command in the particular runspace, wherein the first instruction includes the global context object;

receive, by the remote scripting component via the connection, result data from the remote computer, the result data indicating a result of the execution of the first remote session command;

update, by the remote scripting component, the global context object using the result data to generate an updated global context object;

send, by the remote scripting component via the connection, a second instruction to the remote computer to execute the second remote session command in the particular runspace, wherein the second instruction includes the updated global context object;

wherein the second remote session command is executed using the updated global context object as updated after execution of the first remote session command;

wherein the global context object creates a context affinity between the first remote session command executed by the remote computer and the second remote session command executed by the remote computer;

wherein creating a context affinity between the first remote session command and the second remote session command executed by the remote computer by using both the connection and the global context object when executing the first remote session command and the second remote session command; and wherein each of the plurality of runspaces maintains a global context object and wherein the global context object of a runspace allows two or more commands to be executed within the runspace when the two or more commands do not share a common context by defining a new shared context for executing the two or more commands.

15. The non-transitory computer-readable storage device of claim 14, wherein the remote scripting component is further configured to determine whether the connection pool is available.

16. The non-transitory computer-readable storage device of claim 15, wherein the remote scripting component is further configured to create the connection pool based at least partly on a determination that the connection pool is not available.

17. The non-transitory computer-readable storage device of claim 14, wherein the remote scripting component is further configured to create the connection based at least partly on a determination that the connection is not available.

* * * * *